(12) United States Patent
Linker

(10) Patent No.: US 7,740,925 B2
(45) Date of Patent: Jun. 22, 2010

(54) COMPOSITE LAMINATE AND METHOD OF PRODUCING A COMPOSITE LAMINATE

(75) Inventor: Bruce F Linker, South Haven, MI (US)

(73) Assignee: BLRP, LLC, Bangor, MI (US)

( * ) Notice: Subject to any disclaimer, the term of this patent is extended or adjusted under 35 U.S.C. 154(b) by 560 days.

(21) Appl. No.: 11/709,550

(22) Filed: Feb. 22, 2007

(65) Prior Publication Data

US 2007/0237942 A1    Oct. 11, 2007

Related U.S. Application Data

(63) Continuation-in-part of application No. 10/358,738, filed on Feb. 5, 2003, now Pat. No. 7,273,644, which is a continuation-in-part of application No. PCT/US01/03561, filed on Feb. 2, 2001.

(60) Provisional application No. 60/225,137, filed on Aug. 14, 2000.

(51) Int. Cl.
    B29D 22/00    (2006.01)
    B29D 23/00    (2006.01)
    B32B 1/08     (2006.01)

(52) U.S. Cl. .................... 428/36.2; 428/36.1; 428/36.4; 428/36.5; 428/297.4; 428/297.7; 428/500

(58) Field of Classification Search ................ 428/36.1, 428/36.2, 36.4, 36.5, 36.9, 36.91, 297.4, 428/297.7, 500; 198/735.31, 860.3

See application file for complete search history.

(56) References Cited

U.S. PATENT DOCUMENTS

| 3,616,140 | A  | 10/1971 | Copeland et al. ........... 428/35.7 |
| 4,425,396 | A  | 1/1984  | Hartman |
| 4,597,818 | A  | 7/1986  | Aoyama et al. .......... 156/308.2 |
| 4,944,974 | A  | 7/1990  | Zachariades ............... 428/36.1 |
| 5,098,778 | A  | 3/1992  | Minnick |
| 5,160,472 | A  | 11/1992 | Zachariades |
| 5,286,576 | A  | 2/1994  | Srail et al. |
| 6,216,842 | B1 | 4/2001  | Beale et al. |

FOREIGN PATENT DOCUMENTS

| EP | 0 472 436 A2  | 8/1991 |
| JP | 62-204938     | 9/1987 |
| JP | 59-031145     | 2/1994 |
| JP | 2000-177054 A | 6/2000 |

*Primary Examiner*—Michael C Miggins
(74) *Attorney, Agent, or Firm*—Harness, Dickey & Pierce, PLC

(57) ABSTRACT

The present invention provides a composite material including a substrate layer, a knit porous layer intermixed within the substrate material, and a thermoplastic layer disposed upon the porous layer. The porous layer is at least partially disposed within the thermoplastic layer. The present invention also provides a method for forming the composite material including the steps of: providing a substrate layer, providing a porous layer disposed on the substrate layer, providing a thermoplastic layer disposed on the porous layer, applying pressure and vacuum to mechanically interlock the thermoplastic layer with the porous layer; and bonding the porous layer to the substrate layer.

29 Claims, 14 Drawing Sheets

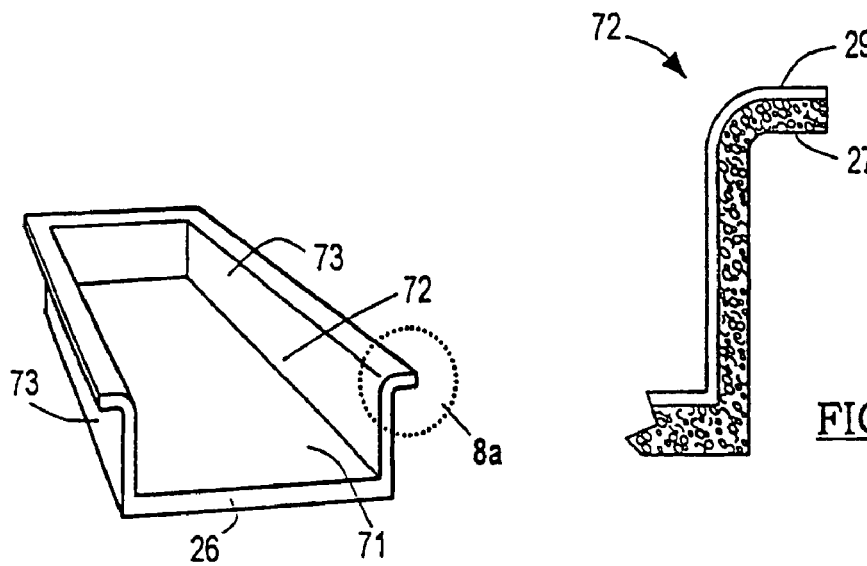
FIG. - 8
FIG. - 8a
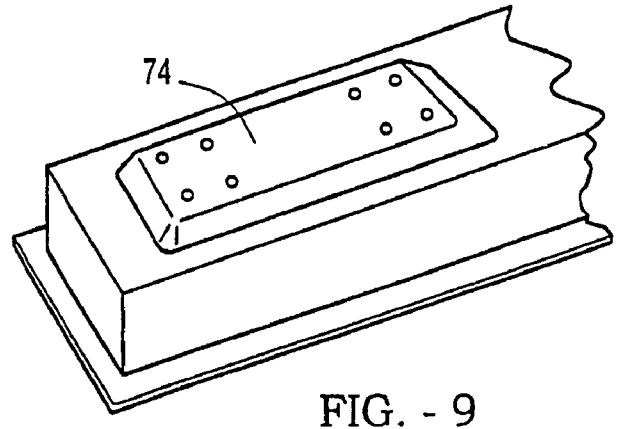
FIG. - 9
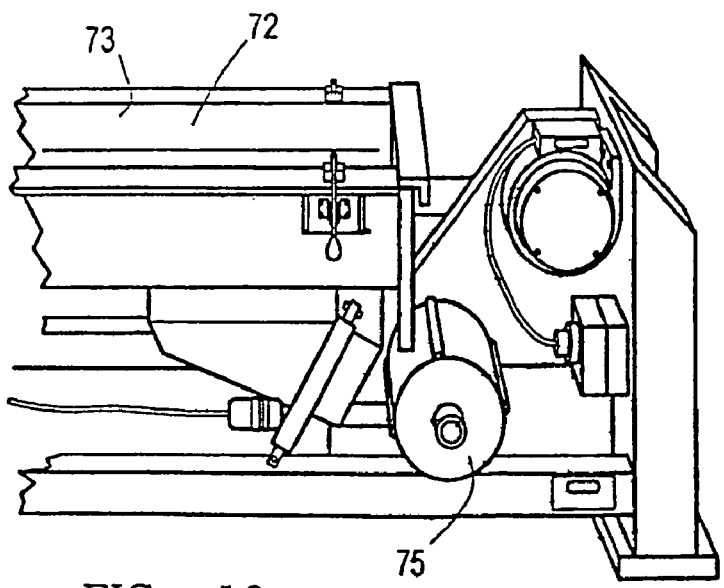
FIG. - 10

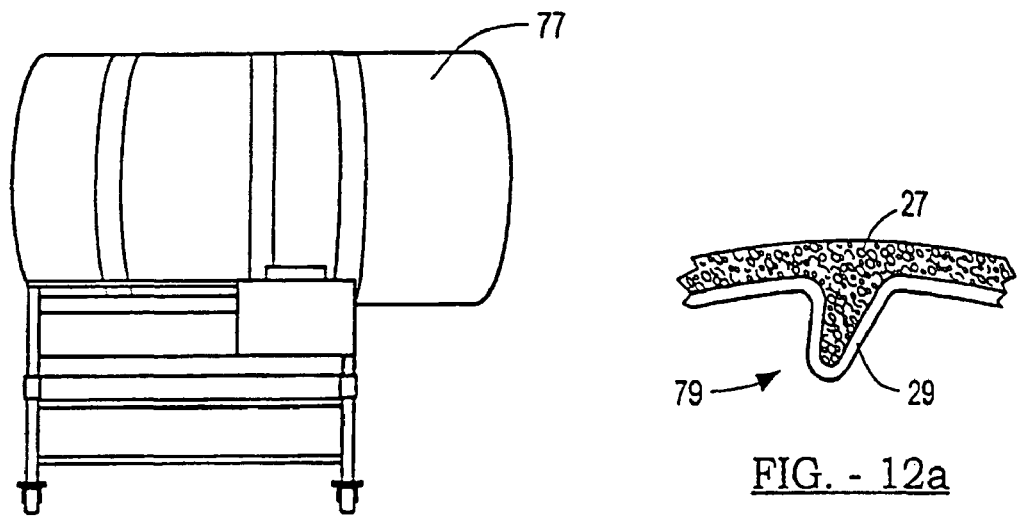
FIG. - 11
FIG. - 12a
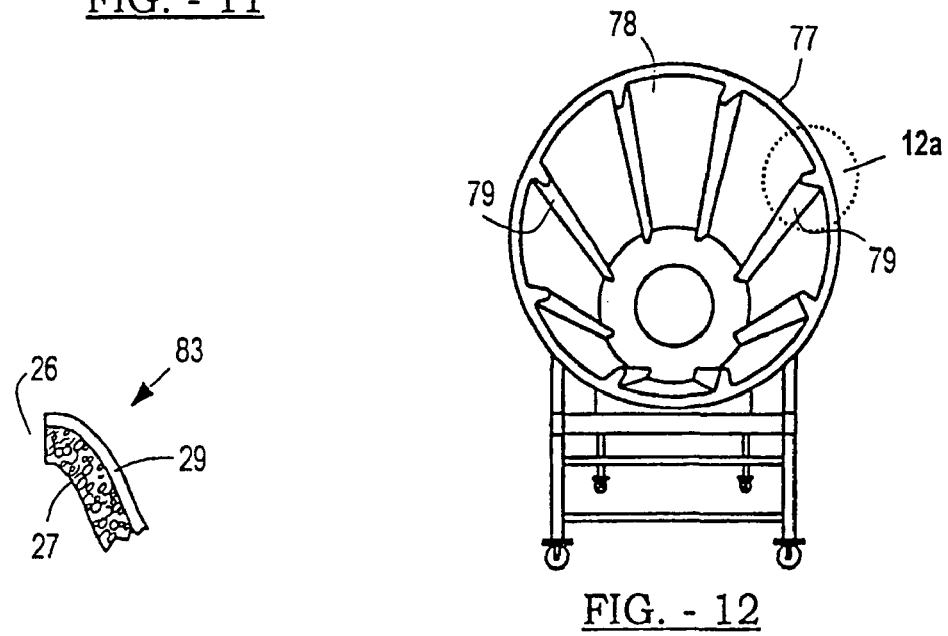
FIG. - 13a
FIG. - 12
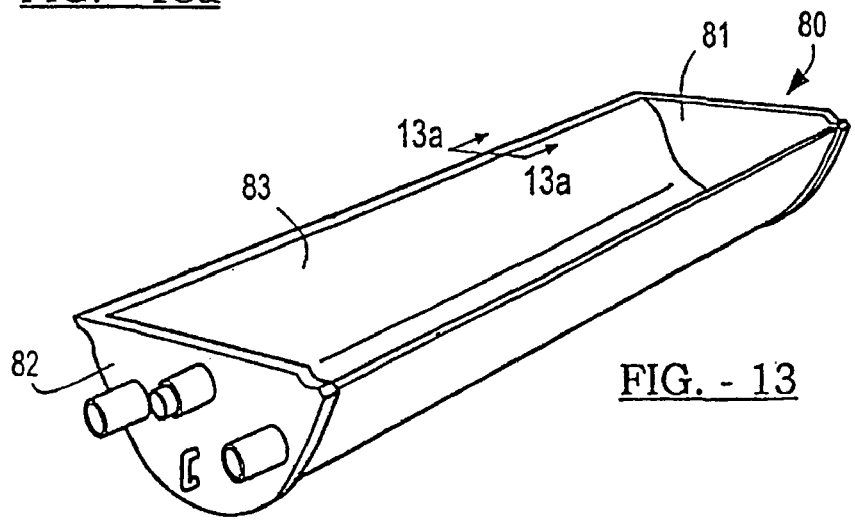
FIG. - 13

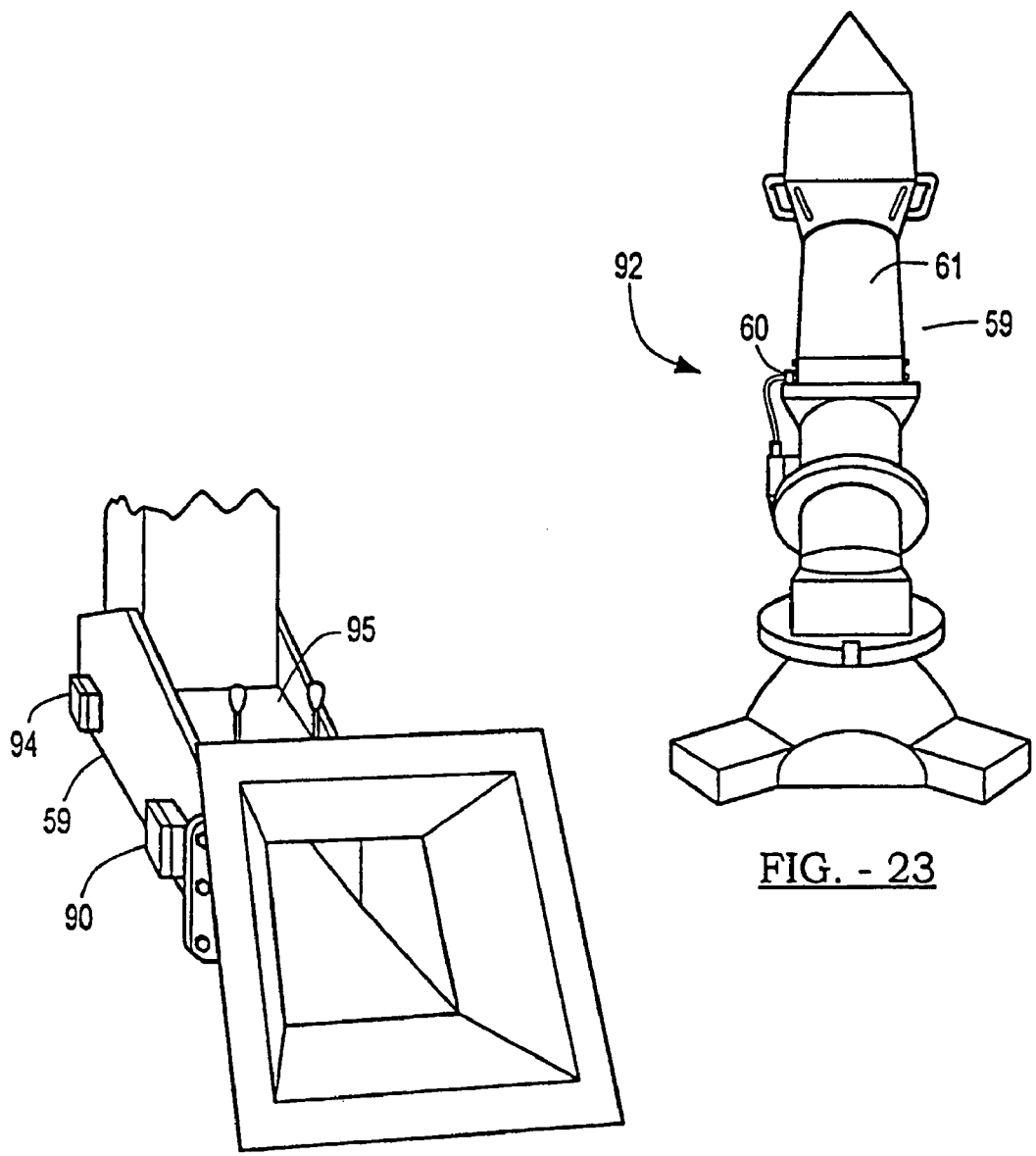
FIG. - 23
FIG. - 24
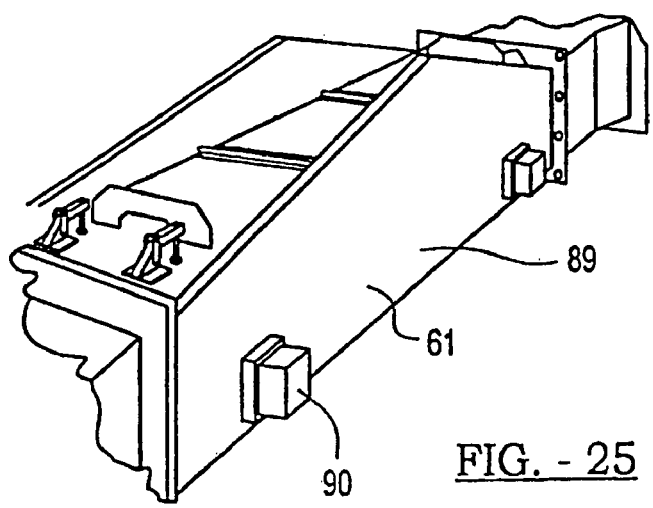
FIG. - 25

FIG 29a
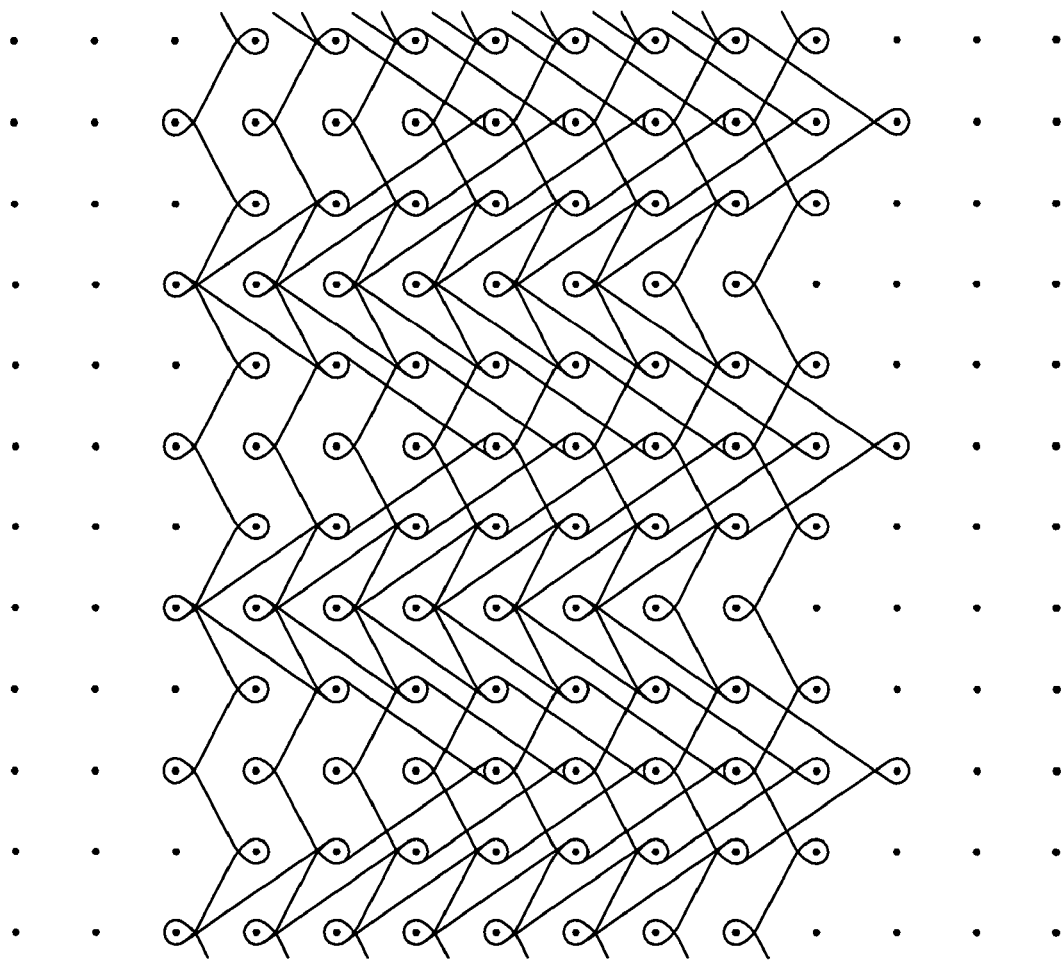
— ATLAS, 2-NEEDLE, OPEN    4-5/3-2/1-0/2-3//
— TRICOT, CLOSED    1-2/1-0//
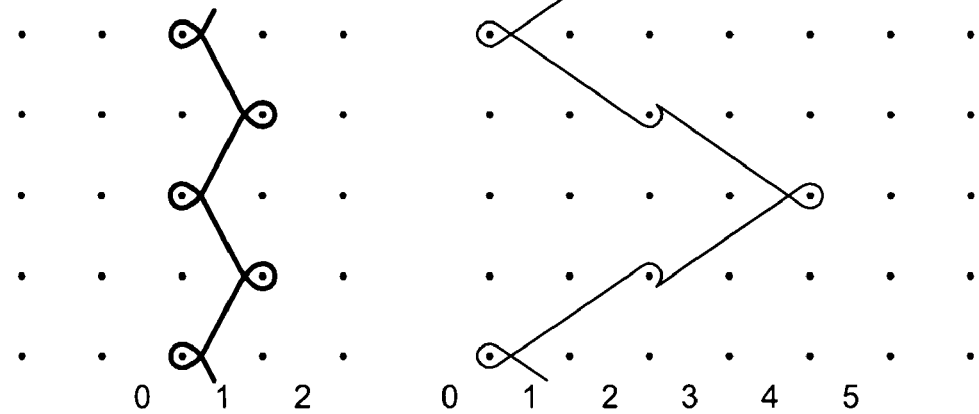
FIG 29b    FIG 29c

COMPOSITE LAMINATE AND METHOD OF PRODUCING A COMPOSITE LAMINATE

CROSS-REFERENCE TO RELATED APPLICATIONS

This application is a continuation-in-part of U.S. patent application Ser. No. 10/358,738 filed on Feb. 5, 2003. U.S. patent application Ser. No. 10/358,738 is continuation-in-part of International Application No. PCT/US2001/03561, filed Feb. 2, 2001, which claims the benefit of U.S. Provisional Application No. 60/225,137 filed Aug. 14, 2000. The disclosures of the above applications are incorporated herein by reference.

FIELD

The present disclosure relates generally to composite materials and to methods of manufacturing the composite materials. In particular, the composite material of the present invention includes a thermoplastic material having a relatively low coefficient of friction such as ultra-high molecular weight polyethylene (UHMWPE) which is bonded by use of a porous material such as a fibrous mat to a substrate.

BACKGROUND

The statements in this section merely provide background information related to the present disclosure and may not constitute prior art.

While not limited in any way to food processing equipment, the present invention was conceived in part to meet a need in the industry. Heretofore, food processing equipment has largely been manufactured from stainless steel due to its known strength and relative durability. It has been discovered that at least certain pieces of stainless steel food processing equipment, particularly those involved in high temperature and vibration environments, tend to be susceptible to stress cracking over time. Further, the cleaning of such food processing equipment manufactured from stainless steel is unnecessarily labor intensive, often requiring at least two people.

In contrast, the composite material of the present invention is resistant to stress cracking, is relatively easy to clean, and tends to be lightweight (generally at least 50% lighter than all stainless steel embodiments). Further perceived advantages include less sticking of food components, reduced noise associated with the product, and speedy assembly and disassembly times, among a host of other advantages.

SUMMARY

The present invention relates to composite materials having a first layer including a thermoplastic material having a static coefficient of friction of less than about 0.25 at 23° C. as measured against chromium plated steel, a second layer comprising a porous material to which the first layer is intimately bonded, and a third layer which is a substrate.

The present invention also relates to methods of manufacturing the composite materials for specific applications. The method generally comprises the steps of:
 a) providing a substrate;
 b) applying a porous layer onto the substrate;
 c) applying a thermoplastic material having a static coefficient of friction of less than about 0.25 at 23° C. over the porous layer; and
 d) joining the materials under vacuum, pressure or a combination of vacuum and pressure.

Further details and advantages of the composite according to the invention, of the method and of the device, are described with reference to the embodiment illustrated in the drawings.

DRAWINGS

The drawings described herein are for illustration purposes only and are not intended to limit the scope of the present disclosure in any way.

Figure 6:
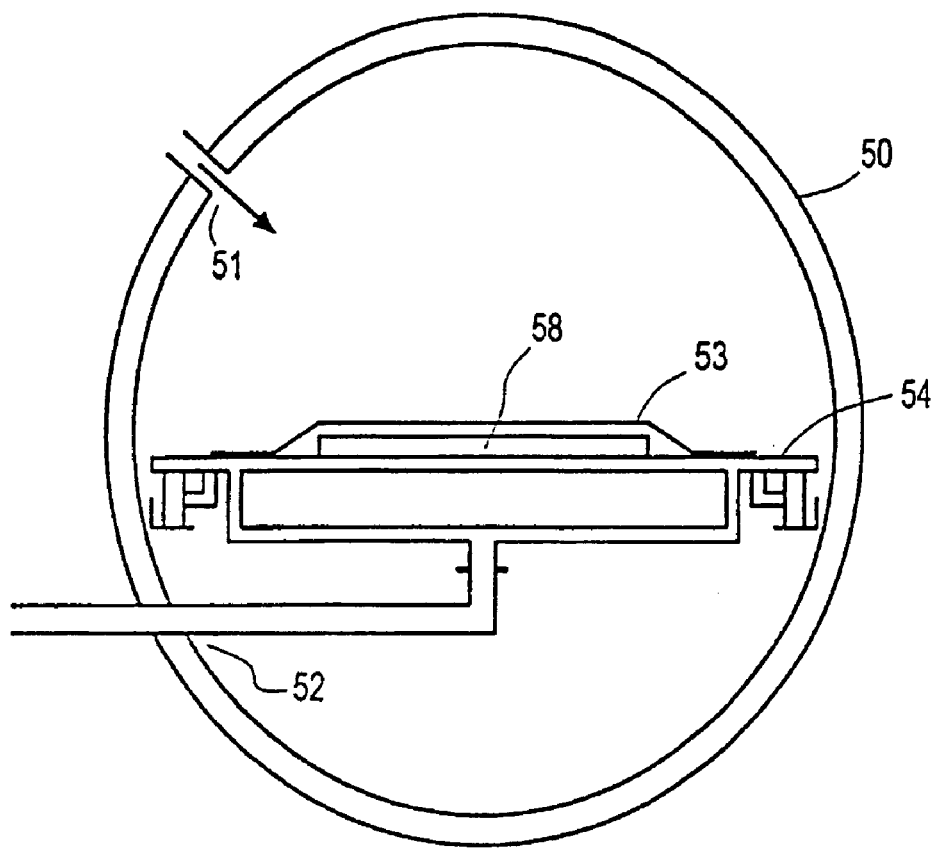
Figure 7:
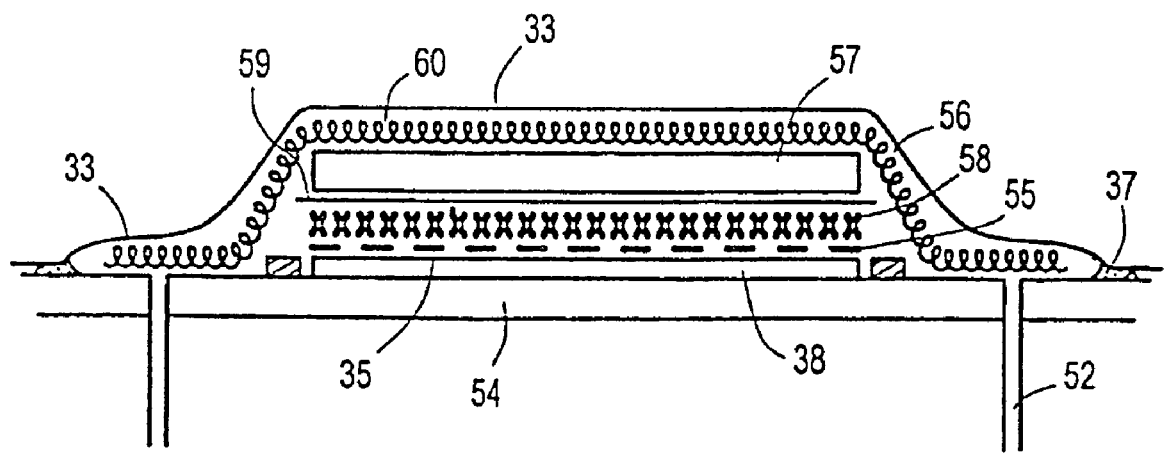
Figure 14:
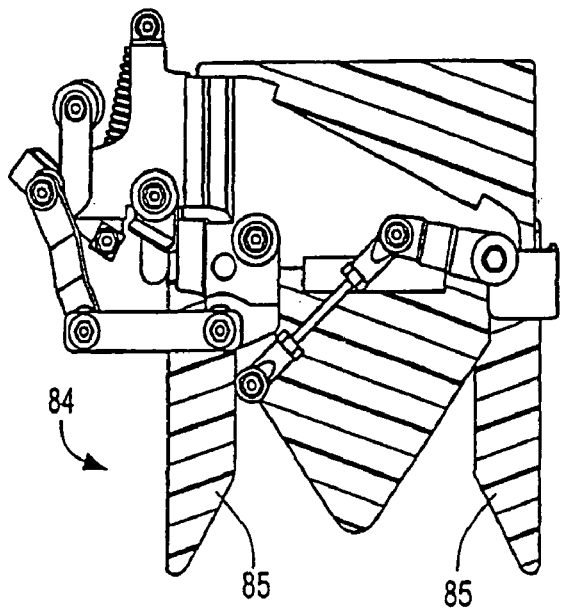
Figure 15:
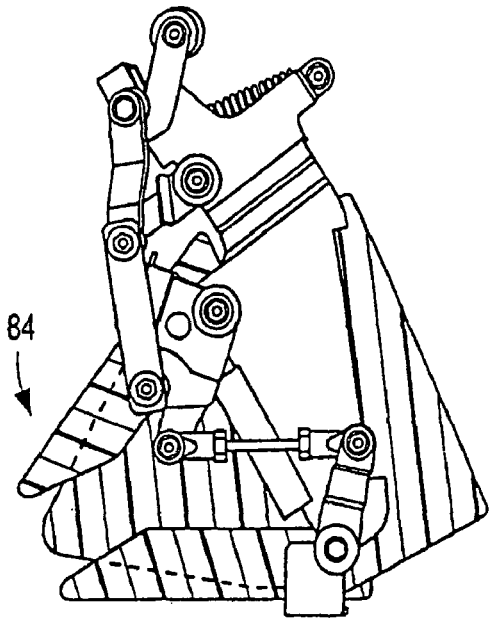
Figure 16:
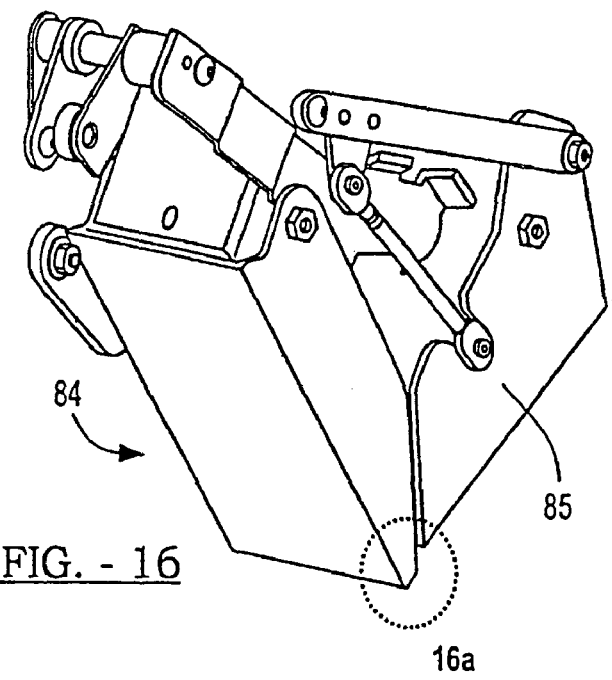
Figure 17:
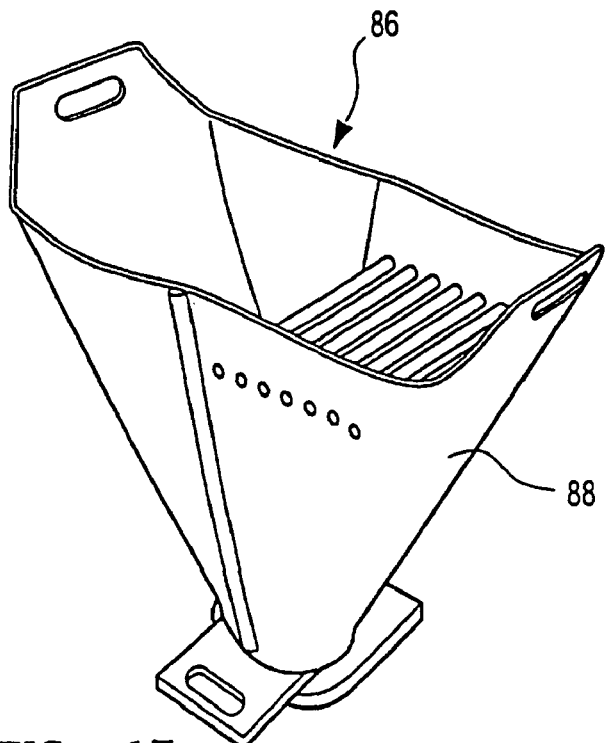
Figure 18:
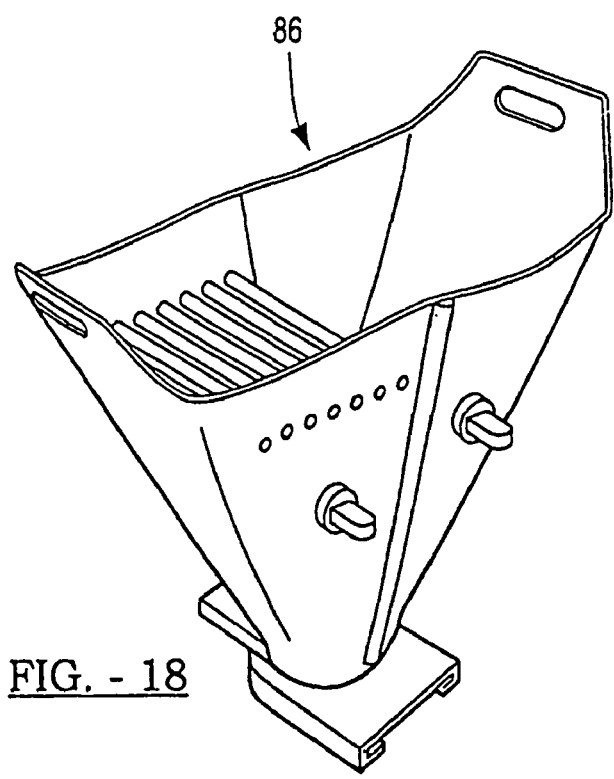
Figure 19:
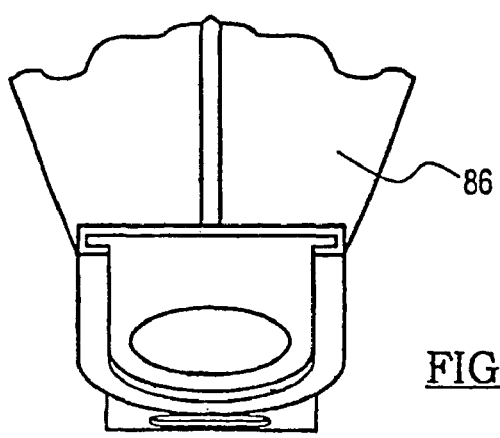
Figure 20:
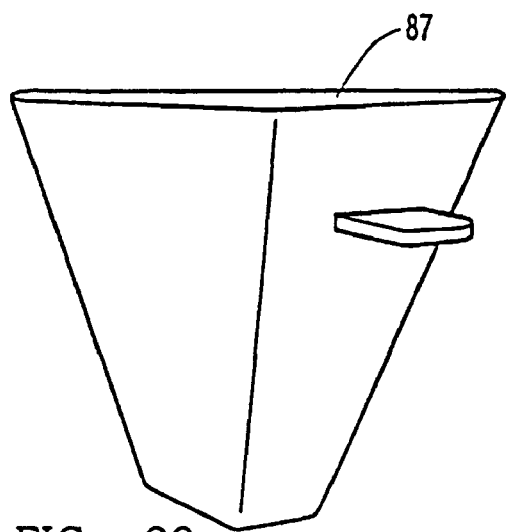
Figure 21:
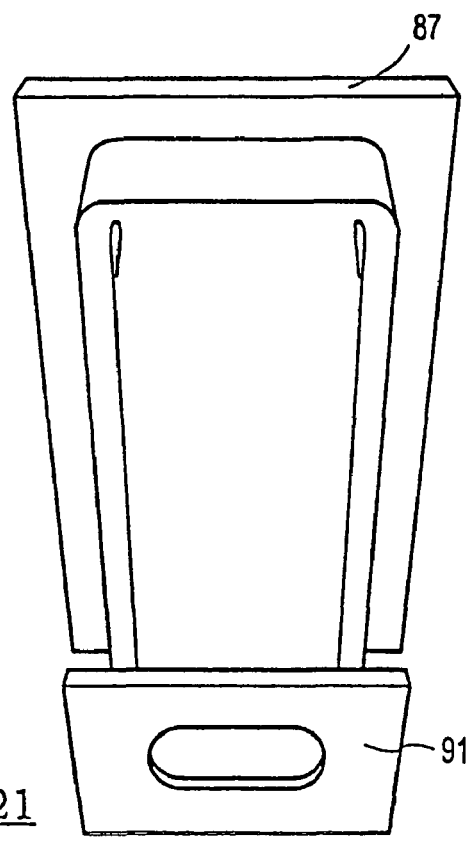
Figure 22:
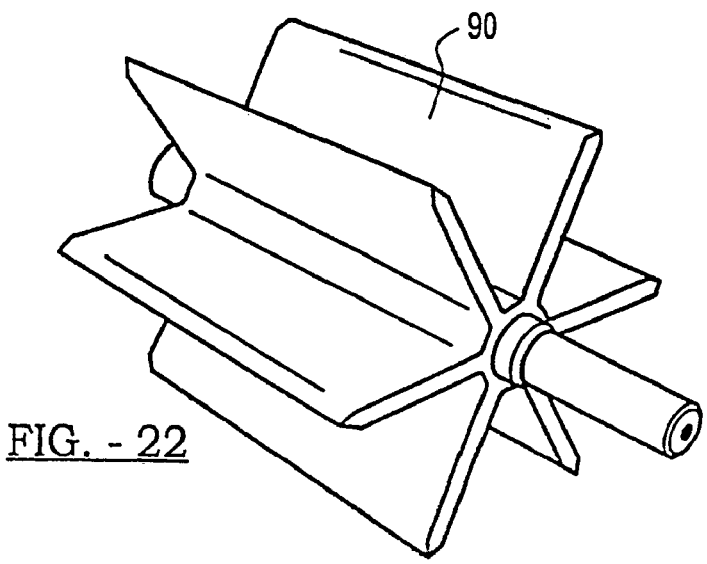
Figure 26:
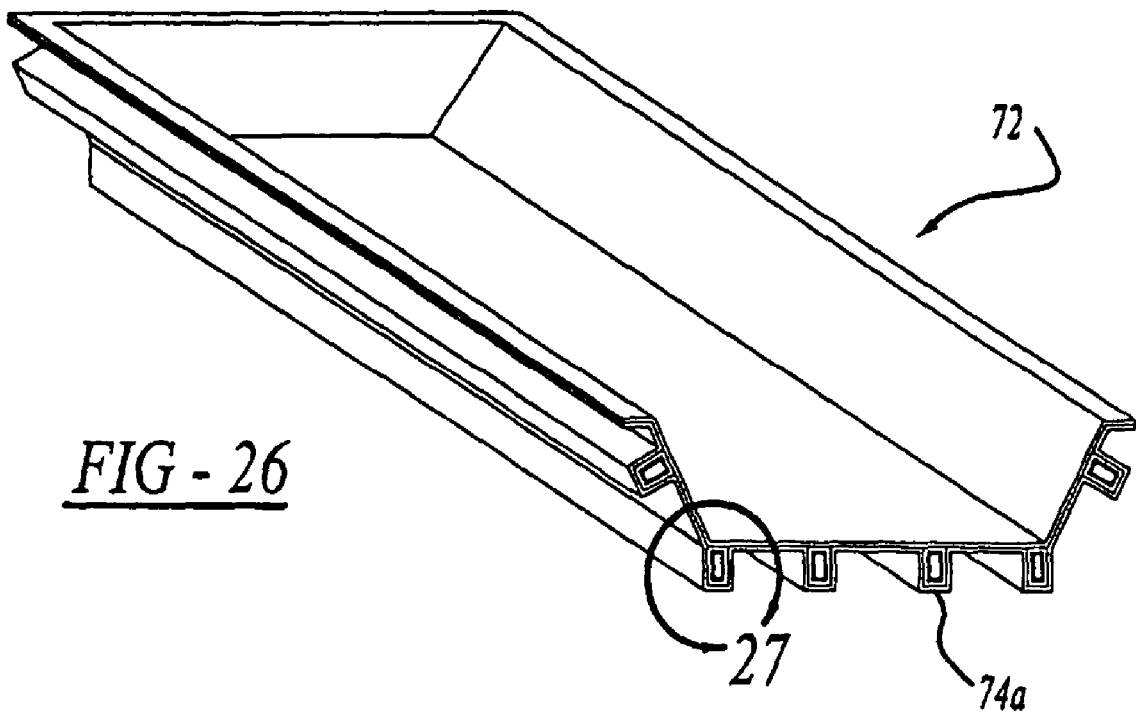
Figure 27:
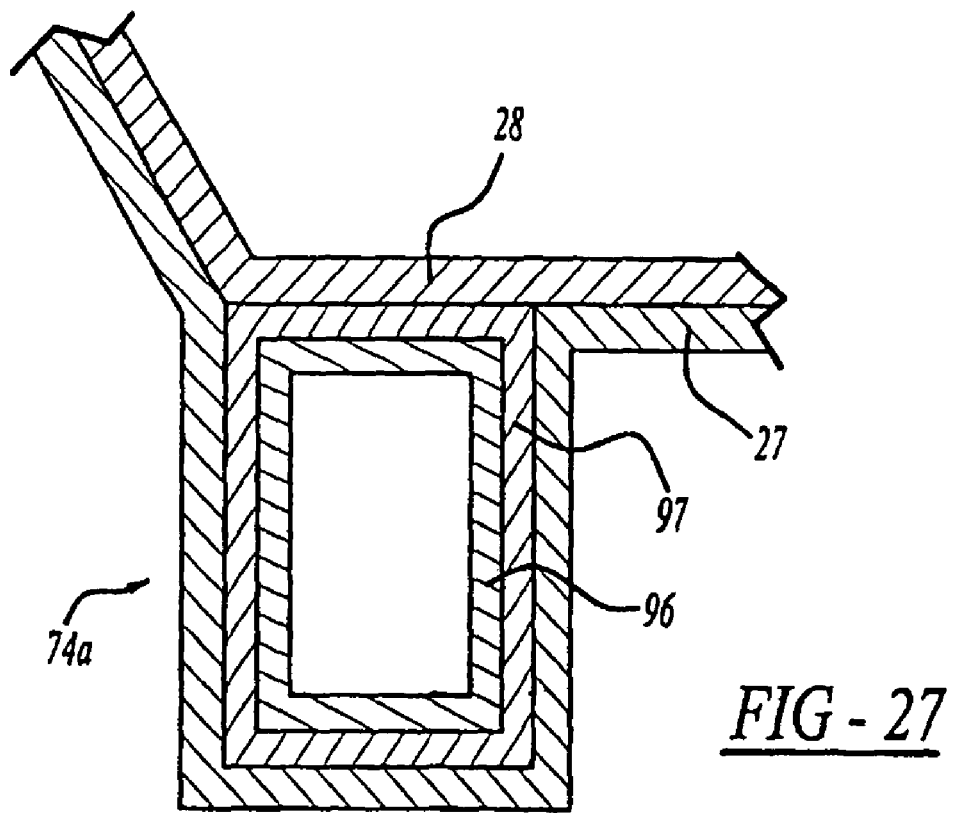
Figure 28:
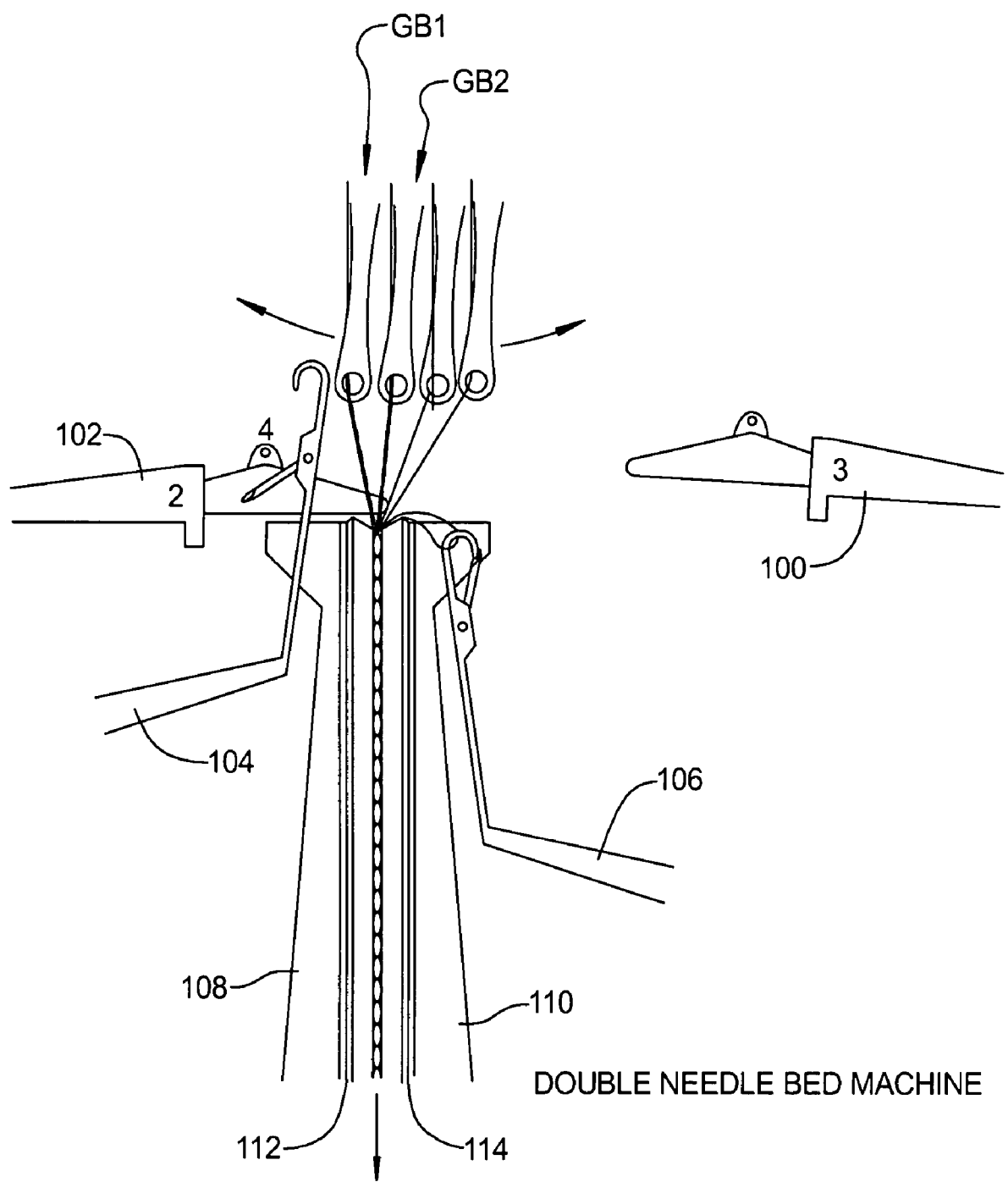

FIGS. 5*a*-5*e* depict a method of manufacturing the material of the current invention;

FIG. 6 is a typical autoclave set-up as is known in the art;

FIG. 7 is a detail of the vacuum bag system for use in the autoclave of FIG. 6, for producing the material in the current invention;

FIGS. 8-10 depict the vibratory pan assemblies as used in the food industry utilizing the composite of the present invention;

FIGS. 11 and 12 represent coating drums using the composite of the present invention;

FIG. 13 represent an elevator lift bucket using the composite of the present invention;

FIGS. 14-16 represent the scale hoppers using the composite of the present invention;

FIGS. 17-19 represent a blending hopper using the composite of the present invention;

FIGS. 20 and 21 represent bagging hoppers using the composite of the present invention;

FIG. 22 represents a static reduced UHMWPE NuCon demount rotary valve using the composite of the present invention;

FIGS. 23-25 represent a raisin let down transition using the composite of the present invention;

FIGS. 26-27 represent the formation of support structures;

FIG. 28 represents the method of forming a knit porous layer;

FIGS. 29*a*-29*c* represent the porous layer shown in FIG. 28; and

Figure 2:
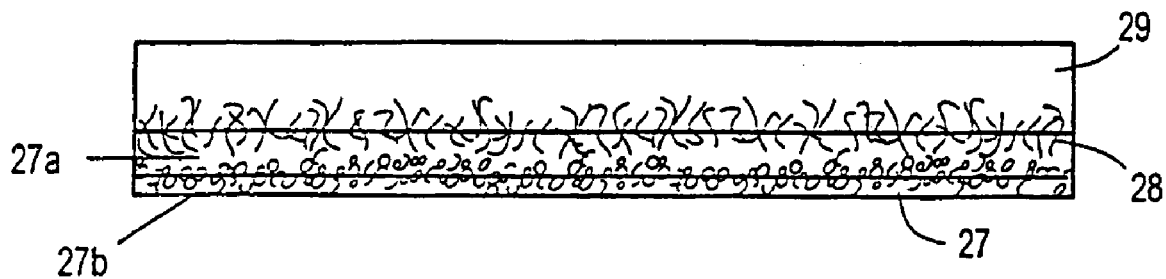
FIG. 2 is a cross-sectional view of a preferred embodiment of the current invention.
Figure 30A:
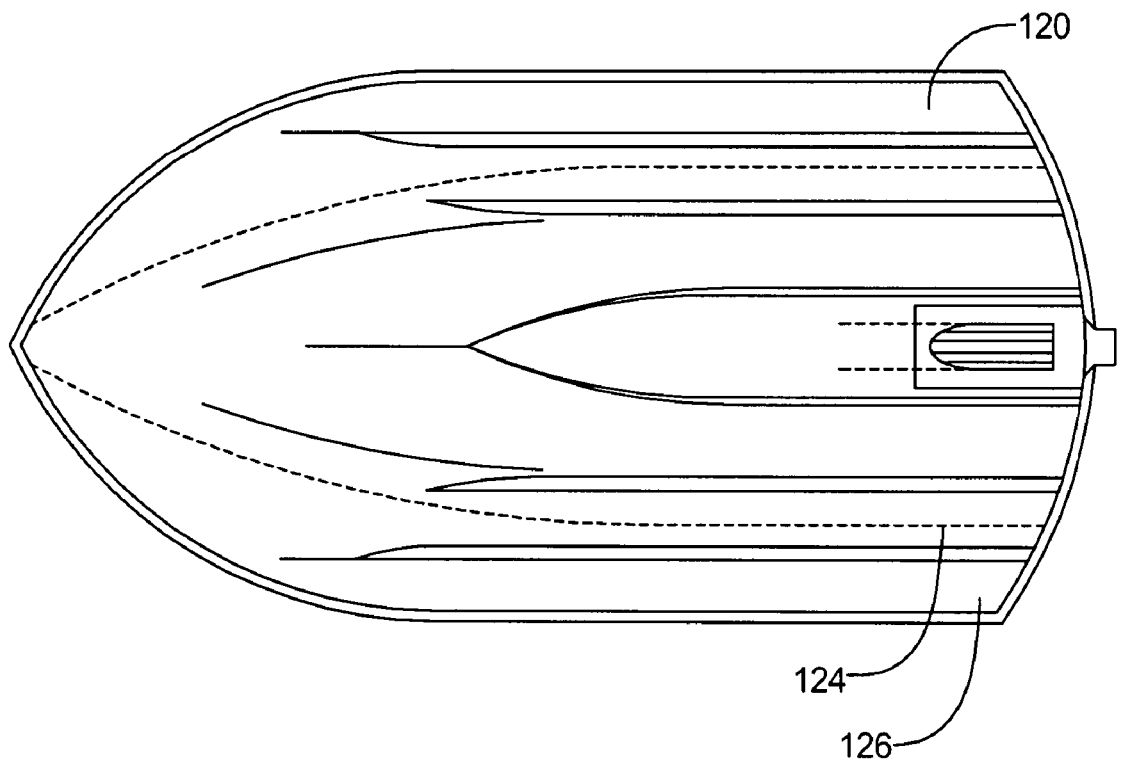
Figure 30B:
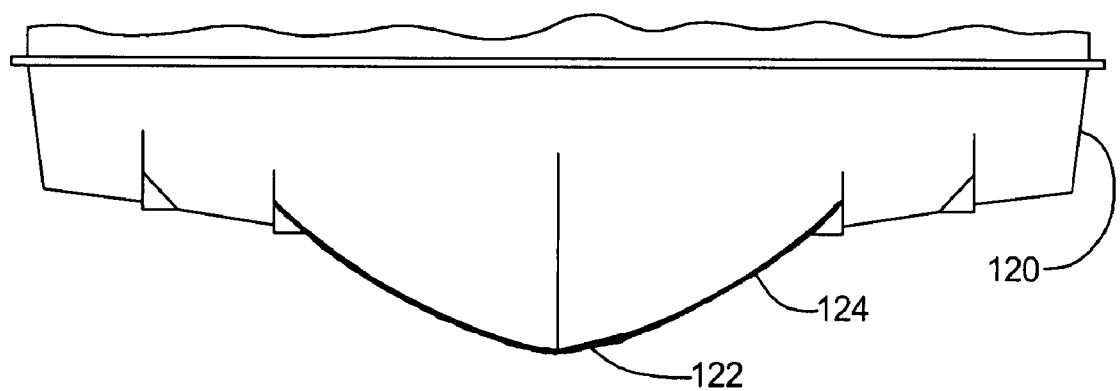

FIGS. 30*a* and 30*b* represent a water craft utilizing a composite material shown in FIG. 2.

DETAILED DESCRIPTION

The following description is merely exemplary in nature and is not intended to limit the present disclosure, application, or uses.

Figure 1:
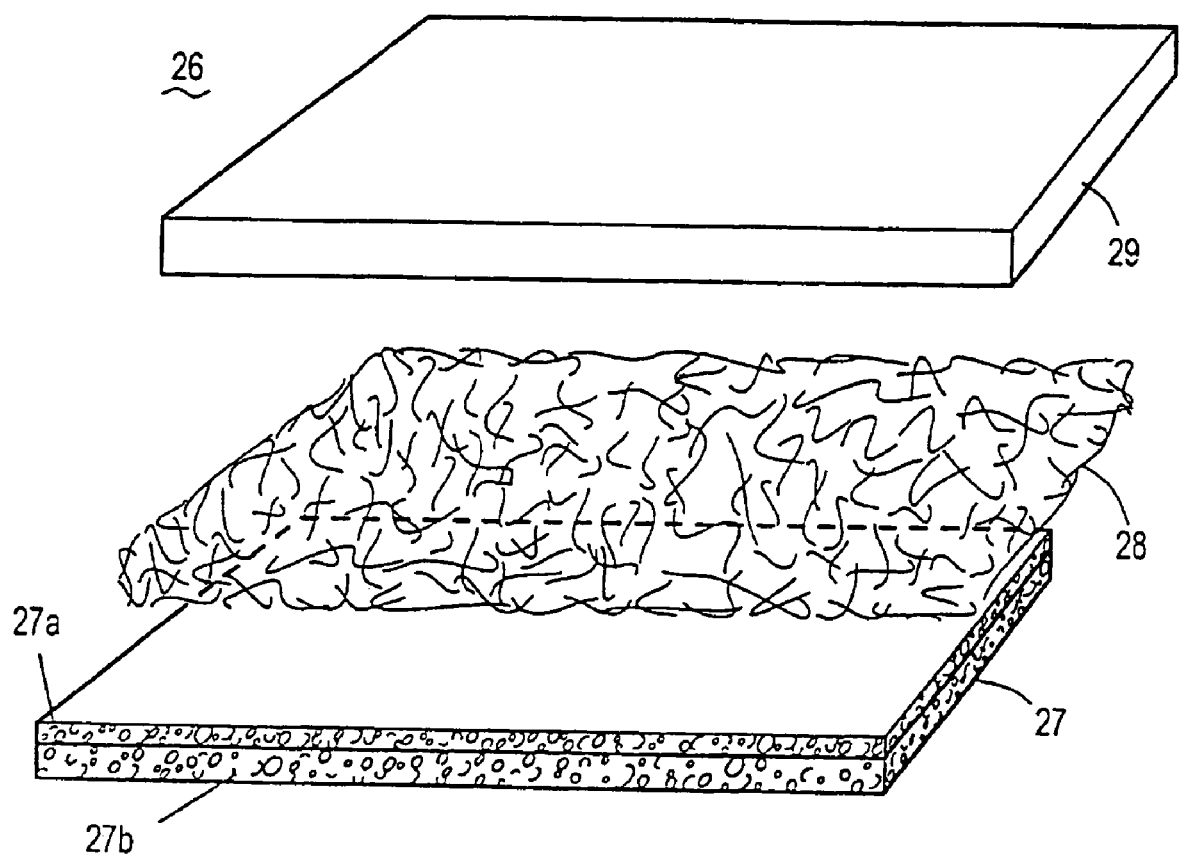
FIG. 1 is an exploded view of the preferred embodiment of the invention.

FIG. 1 depicts the components of a composite 26 in accordance with the teachings of the present invention. Shown is a substrate 27 formed from a thermoformed epoxy, preferably a reinforced thermoformed epoxy made from a two part epoxy. By reinforced it is meant that the epoxy resin includes fibers such as glass, synthetic fibers such as KEVLAR®, carbon fibers, metallic fibers, or particulate by way of non-limiting example. The fibers may be in the form of a woven mat, individual fibers in chopped or unchopped form, or combinations thereof. A particularly useful woven mat is a 3×3 twill carbon fiber reinforcement layer, preferably 3k twill 1161 woven fabric, available from Amoco. A commercially available two part epoxy substrate 27, which is useful in accordance with the teachings of the present invention, is made of West (brand) Epoxy 105 Resin, utilizing a 205 Fast Hardener from Gougeon Bros. Inc, Bay City Mi, with a 3×3 Twill Carbon Fiber reinforcement layer. Under a highly preferred embodiment, the substrate 27 will be a multi-layer construction as designated by reference numerals 27a and 27b.

The composite 26 also includes a porous layer 28, which is in the form of a fibrous mat. It is envisioned that it is possible that the reaction curing the epoxy resin phase of the substrate 27 will be an exothermic reaction. The heat produced by this reaction may assist in the formation of the bond between the thermoplastic layer 29 and the porous layer 28. The fibrous mat can be constructed of glass, steel, or natural and synthetic fibers, by way of non-limiting example. While the porosity of layer 28 may vary depending on the ultimate application for the composite material, the porosity must be sufficient to allow at least some of the thermoplastic material of layer 29 and/or substrate material of layer 27 penetrate the pores of the layer 28 such that direct bonding occurs between layers 27 and 29, respectively.

Figure 3:
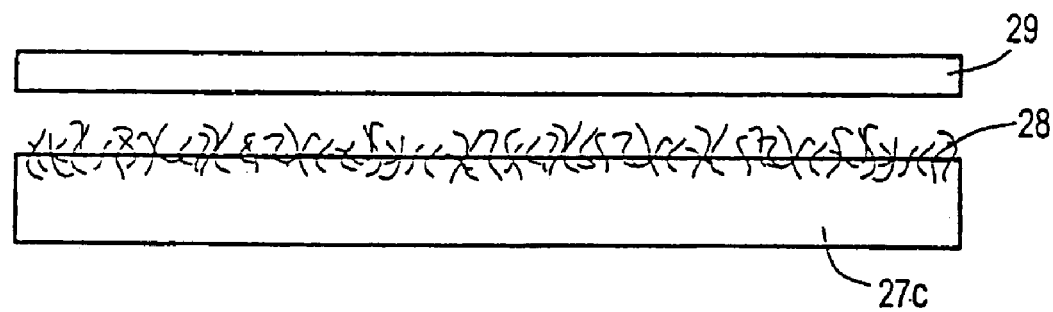
FIG. 3 shows an exploded view of one embodiment of the material of the present invention.

While the porous layer 28 is generally a separate component prior to processing the composite, it should be recognized by those skilled in the art that the porous layer can be partially embedded into either the thermoplastic material or the substrate as shown in FIG. 3 prior to forming the composite.

The third layer 29 of the composite is formed of a thermoplastic material having a static coefficient of friction of less than about 0.25 at 23° C. as measured against chromium plated steel. The thermoplastic material is preferably ultra-high molecular weight polyethylene (UHMWPE) having an average thickness between about 0.2 mm and 10 cm. Ultra-high molecular weight polyethylenes useful in accordance with the teachings of the present invention are available from a number of commercial suppliers such Westlake Corporation of Lenni, Pa. Particularly useful is Westlake's fabric backed, static-reduced UHMWPE. For certain applications, it may be desirable to include additives to the ultra high molecular weight polyethylene such as carbon black to make the material electrically conductive, thus reducing static buildup.

FIG. 2 is a cross-section of a composite formed from the above described components. More particularly, the illustrated composite includes a porous layer 28 impregnated by the cured epoxy resin of the substrate and the thermoplastic layer 29. While traditionally there is a significant amount of difficulty in bonding UHMWPE to other materials, and failure at the bond interface 18 would be expected as will be described in greater detail below, surprisingly testing to date has failed to show a failure along the UHMWPE/substrate interface 18.

Figure 4:
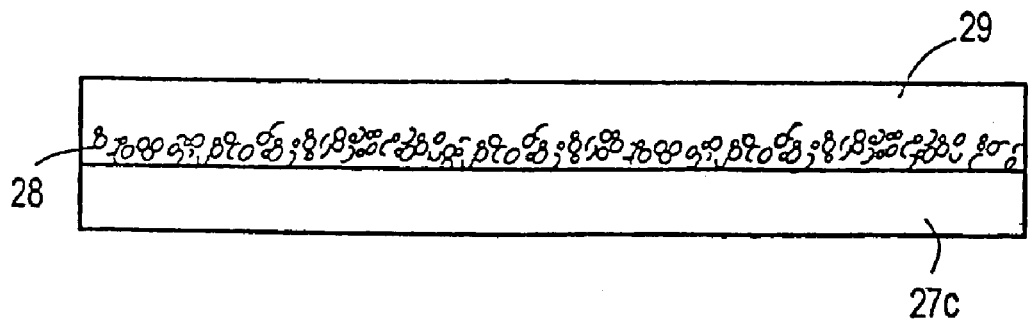
FIG. 4 is an alternate embodiment of the current invention.
Figure 5A:
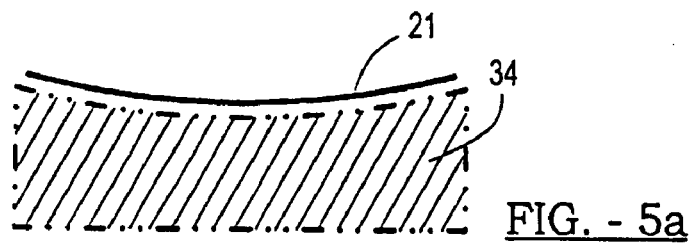
Figure 5B:
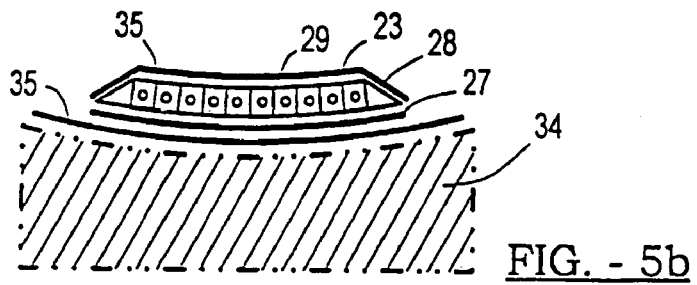
Figure 5C:
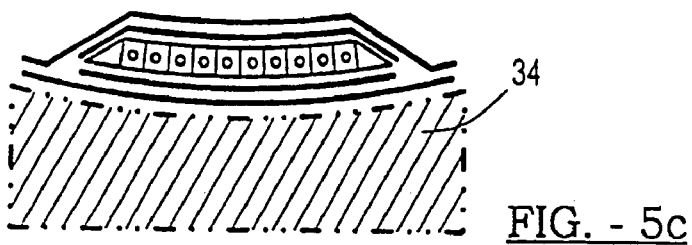
Figure 5D:
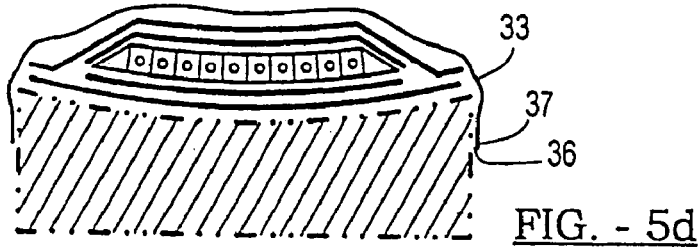
Figure 5E:
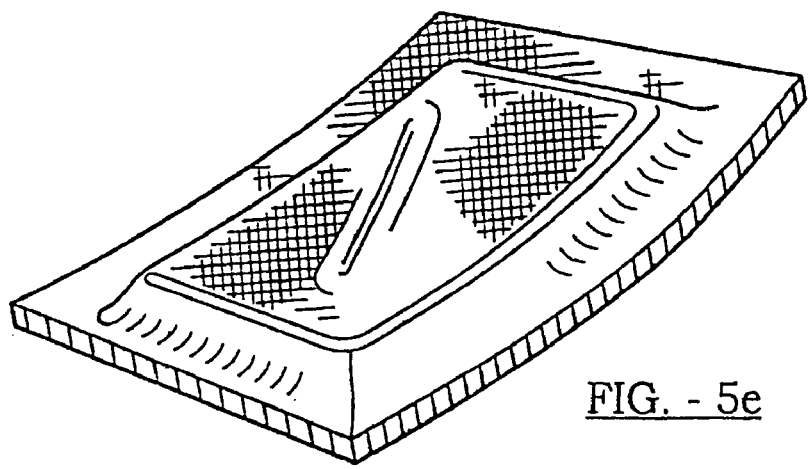

Shown in FIGS. 3 and 4 are alternative embodiments of the composite material wherein the substrate layer 27c is formed of steel or another metal. Disposed on the surface of the substrate is a porous layer 28. In addition to natural, synthetic or carbon fibers, the porous layer 28 may also be formed from metallic fibers or formed by powder metallurgical techniques. As with the embodiment of FIG. 1, the porous layer 28 can be joined to the metallic substrate 27c layer prior to formation of the composite by use of adhesives.

FIGS. 5a-5e, by way of non-limiting example, illustrate formation and processing of a composite material in accordance with the teachings of the present invention. Disposed on a mold plate or tool 34 is uncured reinforced epoxy resin based substrate 27. Optionally, but preferably interposed between the substrate and the mold is a release film 35. A layer of porous material 28 is disposed on the uncured substrate 27 with a layer of thermoplastic material or UHMWPE 29 having a relatively low coefficient of friction disposed thereon. Another layer of release film 35 is optionally disposed over the thermoplastic layer.

To form the composite, a vacuum is applied to the construct. The vacuum may be an integral part of the mold or optionally can be in the form of a vacuum bag 33 having a vacuum line 36 coupled thereto whereby the vacuum bag encapsulates the mold tool. The entire assembly is processed to produce the finished part as is shown in FIG. 5.

FIG. 6 shows a typical autoclave assembly for use in an alternate method of formation of the current invention. The autoclave wall 50, which acts as a pressure vessel and insulator for the air within the autoclave assists in the curing of the epoxy and facilitates removal of air between the layers. Disposed within the autoclave wall 50 is a pressure inlet 51, which is used to bring pressurized air into the autoclave to assist in processing the construct 28. Further disposed in the autoclave wall 50 is a vacuum outlet 52 for pulling gases out of the vacuum bag assembly 33 as described below.

Within the autoclave wall 50 is a mold base plate 54 over which the material is shaped. A flat base 54 is shown, but it is envisioned that the mold base plate 54 can take any shape necessary. Disposed on top of the mold base plate 54 is the construct 58, including substrate 27, porous layer 28, and UHMWPE layer 29, as previously described.

As is seen in FIG. 7, disposed between the construct 58 and the mold base plate 54 is a porous release film 35 which allows the material to be removed from the base plate 54 after processing. Further shown within the vacuum bag 33 is an amount of bleeder cloth 56 which functions to absorb excess epoxy ejected during the process. Although not necessary, it is possible to use a pressure plate 57 to further define the shape of the construct 58. Disposed between the pressure plate 57 and the construct 58 is a non-porous release film 59 which assists in the separation of the pressure plate 57 and the composite construct 58. The vacuum bag 33 is sealed to the mold plate by using a sealant 37. Vacuum outlets 52 are coupled to the cavity 60 formed by the vacuum bag 33. During the processing of the composite material, heat and pressure are applied in the autoclave and vacuum is drawn through the vacuum outlet port 52.

Those skilled in the art will see that there are many uses of the composites produced in accordance with the teachings of this invention. Industries which will benefit from the use of these materials include, but are not limited to, the biomedical, transportation, and conveyor industries. By way of non-limiting examples, FIGS. 8-25 represent components in the food production conveyor industry utilizing the broad teachings of the present invention.

FIGS. 8-10 represent a vibratory pan 72 for use in cereal production utilizing the composite material 26 of the present invention. As can be seen with reference to FIG. 8a, which is a magnified view of a cross section piece of the vibratory pan 72. Upon formation, the vibratory pan 72 includes a layer of static reduced UHMWPE, a plastic material which has been FDA approved for food contact, and eight layers of 3×3 twill carbon fiber reinforcement in a 2-part epoxy resin matrix. The static dissipation by the electrically conductive UHMWPE greatly reduces fine particle buildup on the surfaces of the vibratory pan 72 during food production. The vibratory pan 72 has a bottom horizontal surface 71 and coupled depending sides 73. In this application, the weight of the UHMWPE inclusive components compared to the stainless steel, the material normally used to form vibrating parts, is greatly reduced. e.g. a weight savings of at least 50%. If desired, reinforcing ribs 74 as shown in FIG. 9 can be incorporated into the composite structure. Upon coupling the vibratory pan to a driving apparatus 75 as shown in FIG. 10, the pan is ready for use.

Normal forced outages because of food product buildup in stainless steel pans is generally reduced and therefore, production is increased. Vibratory pans 72 made of the material 26 further see a significant reduction in the amount of sanitation time needed. One particular benefit of the UHMWPE layer 29 in a vibratory pan 72, as used in cereal processing application, is the almost 100% elimination of sugar coatings and marbits dust. Furthermore, raisins and other dried fruits build up is greatly reduced. The elimination of fine particles in the vibratory pan 72 is a significant benefit to the food handling industry. Fine particles which often release after a significant build up cause bags to blow out or an excessive amount of fine particles to be in a product. Because of the static discharging capability of the UHMWPE layer 29, which is electrically grounded, metal detectors which are used to test the integrity of the food stream can be utilized more effectively.

FIGS. 11 and 12 show coating drums 77 made with the composite material 26 in accordance with the present invention. As shown more clearly in FIG. 12a, the coating drum 77 includes a construction, which includes a layer of UHMWPE 29 on a reinforced composite substrate layer 27. By providing a composite construction having an interior layer of UHMWPE 29, there is provided an extremely cost effective way to decrease and reduce product build up in a drum's interior 78. Preferably, the drum interior 78 includes a plurality of paddles 79 also having an exposed UHMWPE layer 29, which assist in the coating of food products. These drums are light weight and further show a benefit of having significantly reduced expansion or contraction due to the low coefficient of expansion of the composite. The reduced coefficient of expansion significantly aids in the line set up of the conveyor system. The coating drums 77 preferably have an interior UHMWPE layer 29 which is FDA approved in either a natural or anti-static grade.

FIG. 13 represents an elevator lift bucket 80 using the composite 26 of the present invention. The elevator lift bucket 80 made using the composite structure including a UHMWPE layer 29 and reinforced substrate layer 27, as illustrated in FIG. 13a, is much stronger than conventional polypropylene models. The end plates 81, 82 of the bucket 80 are removable in case there is a jam because of chain wear in the system. As such, the entire bucket 80 need not be thrown away and generally only the end plates 81 and 82 need be replaced. Again, the exposed interior surface 83 of the bucket 80 is preferably a UHMWPE layer 29. Raisins, sugar coated cereals, marshmallows, and cracker fines do not build up. As cleaning solutions do not affect the material, sanitation time is greatly reduced over standard polypropylene elevator lift buckets 80.

Figure 16A:
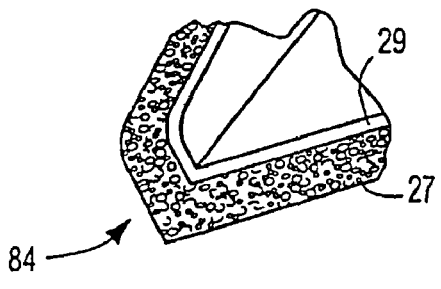

FIGS. 14-16 represent scale hoppers 84 utilizing composite materials 26 of the current invention. Ishida-style scale hoppers 84 having doors 85 made from the composite material shown in FIG. 16a as including UHMWPE layer 29 and reinforced substrate 27 provide a number of benefits. One of which is a significant decrease in the amount of noise the product rushing through the hopper 84 produces. This is a significant ergonomic benefit for plant operations. Furthermore, as with other products using this composite material 26, there is minimal product build up. The material will not stress crack and is easily cleaned.

FIGS. 17-19 represent blending hoppers 86, the housings of which are normally made of stainless steel. The hopper 86, and particularly the hopper housing 88, are made of the composite material 26 which prevents raisins, for example, from clumping together when being blended with other food products such as cereal flakes. The inherent nature of the blending hopper 86 normally leads to a significant amount of material build up and thus requires frequent cleaning. As with the other applications using the composite material of the present invention, there is a significant reduction of fines.

FIGS. 20 and 21 represent the use of the composite material 26 in bagging hoppers 87. These hoppers 87 have shown significant resistance to stress cracks and resistance fines build up, particularly those resulting from sugar coated flakes which are particularly problematic in the cereal production industry. The bagging hoppers 87 made of this material represent a significant weight reduction and are easily cleaned and sterilized. FIG. 21 represents a bag hopper 87 having an integral regulator sleeve 91.

FIG. 22 represents a static reduced UHMWPE NuCon demount rotary valve 90 using the composite material 26. The use of the static reduced UHMWPE components which are FDA approved greatly reduced fine particle build up within the valve. Also eliminated is the risk of static shock when workers come into contact with the components during production. As with the other applications, the weight of the UHMWPE coated components is greatly reduced when compared to stainless steel. Sanitation time is reduced as the UHMWPE is chemically resistant.

FIGS. 23-25 represent a raisin let down transition 92 for the cereal industry using the composite material 26 to make the tube 61. Originally these units were made of stainless steel and included two Teflon coated proximity sensors 94 similar to those shown. However, due to product build up within the raisin and let down transition, the sensing systems have proven to be ineffective. Further, the sensors of prior art embodiments tend to require cleaning several times a day. Thus, by forming at least the food transporting components of the let down transition from the composite material 26, the sensors tend to work better and require fewer cleanings.

The food transporting portion of the let down transition is generally formed by a square tube 95. Furthermore, because of the polymer material of the current invention, proximity sensors are able to be positioned outside of the unit to allow access to the controls and eliminate problems associated with having the sensors within the production flow, which is necessary in metallic transitions.

By way of non-limiting example, a preferred method for producing a composite in accordance with the invention will now be described with reference to the figures, including FIGS. 1-7 in particular. Production of the composite component which has a 3×3 twill carbon reinforcement woven layer 28 embedded with an epoxy resin substrate 27 is prepared by the following steps:

1. Cut substrate material and fabric backed UHMWPE to size and shape (including any add-on pieces).
2. Form any weldments or add-ons required. For example, bottom corners, offset arms for linkage attachment, tabs for linkage attachment, and added material thickness to accommodate mounting or linkage attachment.
3. Lay-up the substrate 27 onto the base 34 using the proper forms, molds, or other means to hold the uncured laminate in its correct shape.
4. Place fabric backed UHMWPE onto lay-up with fabric side down.
5. Place lay-up in vacuum bag and draw vacuum.
   a) Draw a continuous vacuum of 25-30 In./Hg until bag is completely drawn down around part(s)
   b) After bag is completely drawn down set vacuum to AUTO (approximately 20-22 In./Hg)

c) Leave lay-up in bag for 24 hours to achieve full cure of epoxy-resin

6. Trim away excess epoxy and fabric.

After forming the composite, certain post process steps may be required to form a commercial product. For example, the post processing may involve:
  a) Covering the UHMWPE with protective layer;
  b) Sanding the composite surfaces (only) with 36-80 grit sandpaper and filling any surface defects with epoxy and micro-balloon putty (407 micro fillers) and re-sanding;
  c) Spraying a primer such as U.S. Paint-base #D8008 and Converter #D3018 on non-UHMWPE composite surfaces;
  d) Sanding the primed surfaces with 80-180-220 grit sandpaper. Fill any surface defects with primer thickened with micro balloons and re-priming; and
  e) Spraying a color top coat such as U.S. Paint-Awl-Grip, Flat Black, #G2002, Converter-Awl-Cat#2 G3010 on to non-UHMWPE layers.

Thereafter, the peel protective paper coating is pulled off of the UHMWPE, any surfaces needing touch-up are painted, the surfaces are then cleaned, and the composite is packed for shipment. As previously mentioned, the presence of heat from an exothermic curing reaction of the substrate 27 may assist in the bonding of the UHMWPE layer 29 to the porous layer 28. It is envisioned that heat from non-reaction sources may be applied during compression to assist the bonding of the thermoplastic layer 29 to the porous layer 28.

Following essentially the same steps described above, various food multi-layer processing apparatuses or components having cylindrical configurations thereof can be manufactured. Collar assembly, forming tube assembly, and rotating drum are formed using processes applicable for forming tubes. These tubes can have a layer of UHMWPE on both the interior and exterior surfaces of the component. The Formation of the forming tube is as follows:
  a) Cut ⅛" SD-FDA GB material to proper size and shape to form I.D. of tube.
  b) Weld ⅛" SD-FDA GB into tubular shape.
  c) Lay up fiber filament tube with ten (10) layers of woven carbon fiber mat and epoxy resin to form middle section of forming tube "Sandwich". The I.D. of the filament tube must match the O.D. of the ⅛" SD-FDA GB tube from step 1.
  d) Cut another piece of ⅛" SD-FDA GB material to proper size and shape to form O.D. of tube.
  e) Attach part from step 2 to inside of filament tube from step 3.
  f) Attach part from step 4 to O.D. of filament tube to form complete "Sandwich" construction.
  g) Attach add-ons.
  h) Seal seams, edges, etc. as necessary.

The process for forming the collar assembly is as follows:
  a) Cut ⅛" SD-FDA GB material to proper size and shape for collar hood.
  b) Apply carbon fiber matt and epoxy to hood piece with hood piece held into a form of the desired shape.
  c) Apply ⅛" SD-FDA GB material to backside of hood lay up to form "Sandwich" construction.
  d) Repeat steps a-c to form tubular part of collar assembly.
  e) Attach tubular section to hood piece.
  f) Attach add-ons.
  g) Seal seams, edges, etc. as necessary.

Generally flat components such as scale buckets and/or doors can also have a layer of UHMWPE on both the interior and exterior surfaces of the component. The formation of the Baseplate is as follows:
  a) Lay up "Sandwich" construction flat blank.
    One (1) piece ⅛" SD-FDA GB
    ½" carbon fiber matt and epoxy
    One (1) piece ⅛" SD-FDA GB
  b) Cut "Sandwich" construction flat blank to proper size and shape.
  c) Attach add-ons.
  d) Seal seams, edges, etc. as necessary.

The formation of the scale buckets and/or doors are as follows:
  a) Lay up "Sandwich" flat blank piece.
    One (1) layer ⅛" glass-backed UHMWPE.
    Four (4) layers of carbon fiber matt and epoxy.
    One (1) layer ⅛" glass-backed UHMWPE
  b) Cut "Sandwich" lay up to proper size and shape.
  c) Bend and weld respective pieces to proper size and shape using forms as necessary.
  d) Attach add-ons.
  e) Seal seams, edges, etc. as necessary.

As shown in FIGS. 26 and 27, the substrate 27 can form integral flange or box support structures. These structures can be formed of layers having differing properties 97 and 96. In this regard, the box structure can have incorporated metal or composite members.

Alternatively, the composite material can be formed of a layer of UHMWPE having a knit fabric porous layer. In this regard, as shown in FIG. 28, the knit layer can be a three-dimensional fabric produced by a double-needle 22-gauge bed warp-knitting machine using GB1 and GB2 guide bars. As shown, the guide bars GB1 and GB2 interact with the stitch comb bars 100 and 102. These guide bars 100 and 102 interact with the latch needle bars 104 and 106 which interact with the knock-over bars 108 and 110 and knock-over plates 112 and 114 to form the knit fabric as shown. The knit fabric can be formed of glass, basalt, or carbon fibers using a loft-type loop structure. Optionally, the knit can be a spacer-type fabric formed of two surfaces joined by a pile.

The knit porous layer can be formed of knitted 50-75 and, preferably 68 tex glass yard (a mean weight of about 50 to about 75 and, preferably, 68 grams per 1000 meters) having a size finish. Optionally, the size finish can be silane. It is envisioned that the fibers can be coated with other materials to facilitate the bonding of the glass fibers to epoxy resin. The porous layer can be formed of an atlas or tricot knit patterns or a combination thereof (see FIGS. 29a and 29c) formed on an 11-gauge knitting machine. Optionally, the mean stitch length can be between about 0.8 and about 2 mm, and specifically between about 1 and about 1.5 mm, and most particularly about 1.2 mm.

To produce the above-disclosed material, UHMWPE powder having a mean diameter of between 0.1 and 1 mm is placed within a heat press in contact with a layer of knit material as described above. In this regard, the knit material can be placed beneath or on top of the UHMWPE powder. The powder and knit material are then compressed under heat and pressure so that between about 40% and about 60% of the knit material is impregnated within a monolithic UHMWPE sheet.

The powder and knit porous layer can be compressed at temperatures of between about 375-390° F. to (1000 to 1500 psi). Optionally, the powder UHMWPE can be heated and compressed for approximately 1 hour per 10 mm of powder thickness. As shown in FIG. 2, the knit porous layer is mechanically coupled to the monolithic sheet of UHMWPE. This construction can then be bonded to metal or epoxy polymers as described in detail above. It is specifically envisioned that the construction can be coupled to uncured reinforced prepreg epoxy material. As described above, the uncured material can then be subjected to vacuum and heat so as to allow the uncured material to flow into the knit material so as to be in direct contact with the UHMWPE. Alternatively, the UHMWPE sheet and knit porous layer can be bonded to a metallic layer using adhesives such as epoxy adhesive. This adhesive will be positioned so as to place the adhesive in contact with the monolithic UHMWPE layer.

It is specifically envisioned that the size of the UHMWPE particles will be large enough so that they will not pass completely through the material. It is, therefore, envisioned that the specific pore size of the knit material as well as the size of the UHMWPE powder can be adjusted so as to allow the ultra-high molecular weight polyethylene to only flow about 50% through the knit porous layer during the compressive welding process.

FIGS. 30a and 30b represent a boat hull 120 utilizing a composite material 122 described above. In this regard, it is envisioned that a material 122 utilizing a knit porous layer and an UHMWPE layer can be coupled to a portion of a water craft. The material 122 can be coupled to a portion of or the whole underside of the hull. Additionally, the material 122 can be coupled to loading top surfaces of the water craft. The material 122 can be coupled to a metal, composite, or wood hull using epoxy. Additionally, the material can be coupled to the hull 120 using the composite construction techniques described above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A composite material applicable to form a structure, the composite comprising:
    a substrate;
    a knit porous layer partially disposed within said substrate material forming a mechanical bond therebetween; and
    a UHMWPE thermoplastic layer having an average thickness of between 0.2 mm and 10 cm which is in direct contact with said knit porous layer;
    wherein said UHMWPE thermoplastic layer penetrates a portion of said knit porous layer and is directly coupled to the substrate material through said knit porous layer.

2. The composite of claim 1 whereby upon joining said layers said knit porous layer becomes at least partially embedded in said UHMWPE thermoplastic.

3. The composite of claim 1 wherein said knit porous layer comprises a glass yarn having a size finish.

4. The composite of claim 1 wherein said knit porous layer defines pores of a predetermined size.

5. The composite of claim 1 wherein said knit porous layer comprises a loft knit structure.

6. The composite of claim 1 further comprising a substrate including a layer formed from a thermoset material.

7. The composite of claim 6 wherein said substrate layer formed from a thermoset material is selected from the group consisting of reinforced epoxy composite, carbon reinforced epoxy composite, glass fiber reinforced epoxy composite, synthetic fiber reinforced epoxy composite, and woven fabric fiber reinforced epoxy composite.

8. The composite of claim 1 wherein said knit porous layer comprises glass yarn having a weight between about 50 and about 75 grams per 1000 meters.

9. The composite of claim 8 wherein said knit porous layer comprises glass yarn having a weight of about 68 grams per 1000 meters.

10. The composite of claim 1 wherein said knit porous layer comprises a yarn knit into one of an altas knit, tricot knit, and combinations thereof.

11. The composite of claim 10 wherein said knit porous layer comprises a knit material having a stitch length of between about 0.8 and 1.5 mm.

12. A composite material comprising:
    a substrate including a layer formed from a thermoset material;
    a knit porous layer partially disposed within said thermoset material of the substrate forming a mechanical bond therebetween; and
    a UHMWPE layer having an average thickness of between 0.2 mm and about 10 cm, wherein said porous layer is at least partially disposed within said UHMWPE layer and said UHMWPE layer is directly bonded to the thermoset material of the substrate through said knit porous layer.

13. The composite of claim 12 whereby upon joining said layers said knit porous layer is more than 50% embedded in said UHMWPE.

14. The composite material of claim 12 wherein said substrate layer is selected from the group consisting essentially of reinforced epoxy composite, metal, carbon reinforced epoxy composite, glass fiber reinforced epoxy composite, synthetic fiber reinforced epoxy composite, and woven fabric fiber reinforced epoxy composite.

15. The composite material of claim 12 further comprising a pair of depending sidewalls, said UHMWPE layer disposed on said sidewalls.

16. The composite material of claim 12 wherein said composite material defines a vibratory pan.

17. The composite of claim 12 wherein said knit porous layer comprises a glass yarn having a size finish.

18. The composite of claim 12 wherein said knit porous layer defines a plurality of pores having a predetermined size.

19. The composite of claim 12 wherein said knit porous layer comprises a loft knit structure.

20. The composite material of claim 12 wherein said composite defines a bagging hopper.

21. The composite of claim 12 wherein said knit porous layer comprises glass yarn having a weight between about 50 and about 75 grams per 1000 meters.

22. The composite of claim 21 wherein said knit porous layer comprises glass yarn having a weight of about 68 grams per 1000 meters.

23. The composite of claim 12 wherein said knit porous layer comprises a yard knit into one of an altas knit, tricot knit, and combinations thereof.

24. The composite of claim 23 wherein said knit porous layer comprises a knit material having a stitch length between about 0.8 and about 1.5 mm.

25. A composite comprising:
    A substrate including a layer of thermoset material selected from the group consisting of reinforced epoxy composite, carbon reinforced epoxy composite, glass fiber reinforced epoxy composite, synthetic fiber reinforced epoxy composite, woven fabric fiber reinforced epoxy composite, and combinations thereof;
    a knit porous layer partially disposed within said substrate layer of thermoset material forming a mechanical bond therebetween; and a UHMWPE layer having an average thickness of between 0.2 mm and 10.0 cm which is in contact with said porous layer;

wherein said UHMWPE layer and said substrate penetrate said knit porous layer and are directly coupled together.

26. The composite of claim 25 whereby upon joining said layers said knit porous layer becomes at least partially embedded in said UHMWPE.

27. The composite of claim 25 wherein said porous layer is selected from a group consisting essentially of a fibrous mat, glass fibers, synthetic fibers, and natural fibers.

28. The composite of claim 25 wherein said composite is used to form a vibratory pan.

29. The composite of claim 25 wherein said composite is used to form a bagging hopper.

\* \* \* \* \*